United States Patent Office 2,751,332
Patented June 19, 1956

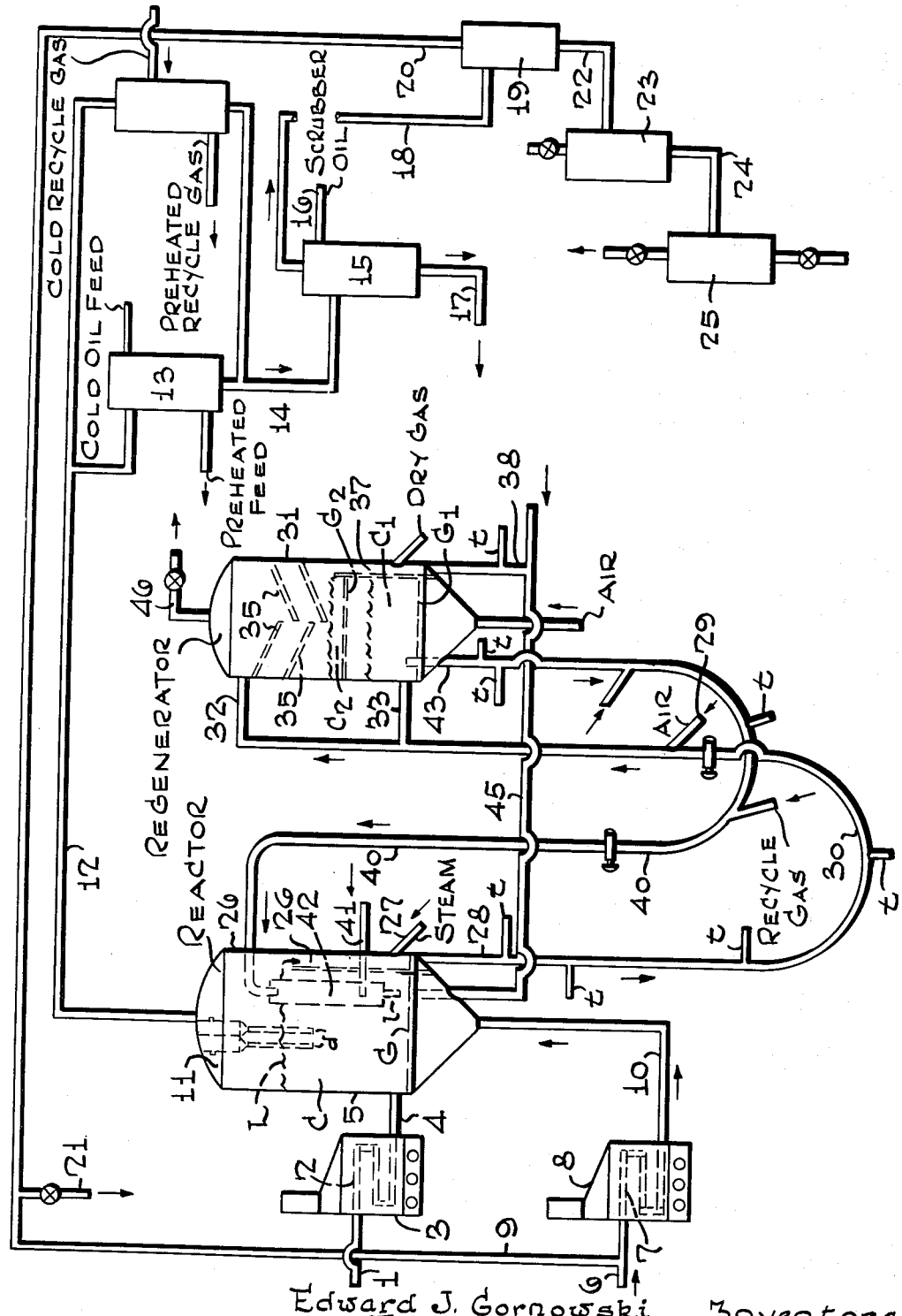

2,751,332

FLUID HYDROFORMING OF HYDROCARBONS WITH CATALYST REGENERATION

Edward J. Gornowski, Cranford, and Wilson C. Rich, Jr., Mountainside, N. J., assignors to Esso Research and Engineering Company, a corporation of Delaware Application April 30, 1952, Serial No. 285,258

8 Claims. (Cl. 196—50)

The present invention relates to improvements in the catalytic reforming of naphthas in a process in which a catalyst is employed in the form of a fluidized bed. More particularly, the present invention relates to improvements in the regeneration of the catalyst, which during the on-stream operation becomes contaminated with carbonaceous deposits which impair the activity of the catalyst and require removal.

Heretofore and prior to the present invention, others had employed a two vessel system consisting of a reactor and a regenerator for carrying out the hydroforming of virgin naphthas to up-grade the naphthas by the fluidized solids technique.

Hydroforming may be indicated as an operation in which a virgin naphtha containing naphthenes is contacted at elevated temperatures and pressures with a solid catalytic material in the presence of added or extraneous hydrogen, the process being characterized by the fact that there is no net consumption of hydrogen. In hydroforming the main chemical reactions involved are dehydrogenation of naphthenic hydrocarbons to the corresponding aromatic, some hydrocracking of the paraffins present in the feed and some isomerization. The reaction is highly endothermic. When properly operated, the hydroforming operation gives high yields of high octane gasoline constituents.

As previously indicated, the hydroforming catalyst which may be a VI group metal oxide carried on a suitable support, such as activated alumina, requires a periodic regeneration. The usual way to regenerate the catalyst is to treat with an oxygen-containing gas, such as air, to burn off the carbonaceous deposits. This regeneration of catalyst must be carried out with care because there is some danger of baking or fusing the catalyst and, therefore, damaging it if the temperature during regeneration becomes too high. It is conventional practice, therefore, to abstract heat from the catalyst undergoing regeneration in order to prevent injury to the catalyst. The heat removal system of the regenerator is expensive and furthermore, is undesirable from the heat economy standpoint. With respect to the heat economy in the hydroforming fluid system, it is desirable to make maximum use of the sensible heat contained in the hot regenerated catalyst by transferring such catalyst directly and uncooled to the reactor. If it is necessary to remove heat from the regenerator catalyst bed during the regeneration, it is obvious that full use is not made of the heat of regeneration in the reaction zone.

Heretofore, the major portion of the required heat has been added to the reactor by means of the "recycle gas," that is, the hydrogen-containing gas obtained from the product recovery system. The hot regenerated catalyst supplied a relatively minor portion of the heat of reaction. This method of adding heat to the reactor has the serious drawback that since the recycle gas and, of course, the naphtha feed contain hydrocarbons, they may undergo thermal cracking during the preheat, thus not only causing the loss of hydrocarbon yield, but fouling the furnace coils as well.

It would also be most desirable in operating the hydroforming operation using fluid catalyst technique to operate at a high catalyst to oil ratio, in other words, to feed to the reaction zone four or more pounds of hot catalyst for each pound of oil. This technique, however, has the great disadvantage that high catalyst to oil ratios fed to the reaction zone causes high carbon formation which, of course, results in yield losses and also increases the amount of air that must be compressed to burn off the inordinately large amounts of carbon formed on the catalyst.

In order to correct and improve the foregoing deficiencies in present practice in carrying out the hydroforming operation, the present invention, in brief, proposes carrying out the regeneration in a regeneration vessel containing two zones. In the top zone partial regeneration is carried out, while in the lower zone complete regeneration is carried out. For example, four-fifths of the catalyst is partially regenerated in one zone, while one-fifth is completely regenerated in a second zone, in a specific instance. This technique allows regeneration to be carried out at lower temperatures, while still transferring all of the available heat of combustion to the reactor by means of the partially regenerated catalyst from the upper zone, all of which will more fully appear hereinafter.

Another important feature of the present invention is that oxidation and reduction of the incompletely regenerated portion of the catalyst is avoided. To explain this latter point a little more fully, as pointed out above, the catalyst may be, say, molybdenum oxide dispersed on activated alumina. In the reaction zone the molybdenum oxide has a state of oxidation which is somewhat lower than that corresponding to $MoO_3$, probably a state of oxidation corresponding to a valence of about 5. When the catalyst is regenerated and the carbon completely burned off, the molybdenum is reoxidized to its maximum valence 6. Not only does this increase the oxygen requirements and the air compressor requirements, but it also requires normally, a reduction of the catalyst with hydrogen prior to re-introduction of the catalyst into the reaction zone. This hydrogen reduction is called a "pretreat" and serves to render the catalyst more suitable to influence the hydroforming process.

The advantages of the present invention over prior practice among others are listed below:

(1) The present operation effects improved yields of desired product due to the fact that the amount of carbon on the catalyst in the reactor is lower than that of preivous proposals, and the further fact that since a reduced amount of heat is carried into the reactor by the recycled hydrogen-containing gas, cracking losses are reduced.

(2) A reduced amount of recycled gas or a reduced pressure drop on the same amount of recycled gas, and with it, recycle gas compression requirements are reduced.

(3) The regenerator is operated at a lower temperature as compared with conventional proposals.

(4) The recycle gas temperature is reduced to about 1000° F. as compared with prior proposals which sets this temperature at 1200° F. or even higher.

(5) Complete utilization of the air used in regeneration with no excess air required.

(6) Elimination of cooling coils and the like in the regenerator.

In the accompanying drawing there is set forth schematically, an apparatus layout in which a preferred modification of the invention may be carried into effect.

Referring in detail to the drawing, a virgin naphtha boiling within, say, 200°–325° F. containing 30–35% or more of naphthene hydrocarbons is introduced in the present system through line 1, thence passed through a fired coil 2, disposed in a suitable furnace setting 3, where it is heated to a temperature of about 1000° F., whereupon the heated and vaporized oil is withdrawn through line 4 and charged into a reactor 5 containing a bed of powdered fluidized catalyst C, which is in dense phase suspension extending from a grid or other foraminous member G to an upper dense phase level L. Above L in reactor 5 there is a dilute suspension of catalyst in gasiform material.

A hydrogen-containing gas at the start of operations is introduced into the present system through line 6 and thence passed through a fired coil 7 disposed in a suitable furnace 8. After the process has been in operation, extraneous hydrogen will not be required; rather hydrogen may be recycled from the product recovery system as subsequently described and charged to line 6 from line 9. The hydrogen-containing gas is heated in coil 7 to a temperature of 900–1000° F., and thence withdrawn through line 10 and charged into the bottom portion of reactor 5 as indicated. Under conditions more fully set forth hereinafter in the form of an example, the desired hydroforming reaction occurs and a product passes from the dense phase of catalyst through the dilute phase, and before passing from the reactor 5, it is forced through one or more cyclone separators 11 wherein entrained fines are separated from the gasiform products and returned to the dense phase by one or more dip pipes $d$. The gasiform product material passes from the reactor through line 12 and is thence passed first to a cooler 13 where it passes in heat exchange relationship with any suitable coolant, but preferably, with cold feed and cold recycle gas. The cooled product is then passed via line 14 to a scrubber 15 wherein catalyst dust still remaining in the vapors is scrubbed out and polymer or high boiling material is also removed. For the removal of this material, oil is introduced in the top of the scrubber 15 through line 16 and withdrawn through line 17. The scrubbed vapors separated from polymer and catalyst are withdrawn from the scrubber 15 through line 18 and delivered to a condenser 19 where they are cooled to temperature sufficiently low to condense the remainder of the normally liquid material. The "recycle gas" is withdrawn overhead in line 19 through line 20 and passes to line 9 from which it is delivered to line 6 for reuse in the process, after suitable heating. A portion of this recycle gas may be rejected from the system through line 21, together with whatever sulfur compounds are present in or formed from the original oil feed. The condensed liquid from condenser 19 is delivered by line 22 to a finishing still 23 from which the bottoms withdrawn through line 24 are recovered for product and delivered to a storage drum 25.

Referring again to reactor 5, as previously indicated, the nature of the process is such that the catalyst becomes contaminated with carbonaceous deposits which have the effect, of course, of impairing its activity. Consequently, it is necessary to regenerate the catalyst to remove these carbonaceous deposits. Toward this end, the catalyst is withdrawn from reactor 5 through a spillway or downcomer 26. Steam or other suitable gas is injected into the downcomer 26 from line 27 in order to strip off volatile hydrocarbons. The stripped catalyst passes via standpipe 28 carrying the usual gas taps $t$ into an air stream 29 where it is formed into a suspension and passes via air lift line 30 upwardly to the regenerator 31. It will be noted that the suspension of catalyst and air is fed to the regenerator at two points, namely, at an upper portion 32 and a lower portion 33, respectively, of said regenerator. The proportion of catalyst fed at these two points may vary, but in any event, a greater portion of the catalyst in line 30 is fed via line 32 to the upper portion of the regenerator. Additional air is injected into the regenerator 32 through a supply line connected to the bottom of the regenerator from where it passes upwardly through a grid $G_1$ or other suitable gas distributing means, and thence into a dense fluidized bed of fouled catalyst $C_1$. Sufficient air is fed into this bed of catalyst $C_1$ to substantially completely regenerate the catalyst fed to said bed from line 33. The regeneration fumes and the residual oxygen then pass from bed $C_1$ upwardly through grid $G_2$ through bed $C_2$ of partially regenerated catalyst and thence upwardly against catalyst introduced through line 32, which catalyst flows downwardly over baffles 35 or other contacting devices countercurrent to the upflowing regeneration fumes and oxygen still contained in the air introduced through 34 and 33.

As indicated in the drawing, a second grid or other foraminous member $G_2$ is disposed in the regenerator 2 and partially regenerated catalyst collects on this said grid $G_2$ forming a fluidized bed of catalyst thereon. From this bed, the partially regenerated catalyst is withdrawn downwardly through drawoff 37 in which volatile material, such as water and $CO_2$ can be stripped off, if desired. The stripping can be done by use of a hydrocarbon gas. The stripped partially regenerated catalyst is withdrawn from 37 through a standpipe 38 carrying the usual gas taps $t$ through which small quantities of gas are introduced for the purpose of improving the fluidity of the downflowing catalyst. The catalyst in standpipe 38 is then charged into line 45 containing a conveyor hydrogen-containing gas in which gas, the catalyst is formed into a suspension and conveyed in this form into the reactor 5. The catalyst introduced through line 45 contains, as stated, some carbon which may amount from 0.30 to 0.60 wt. per cent based on the total catalyst.

Meanwhile, the completely regenerated catalyst in bed $C_1$ is withdrawn through a standpipe 43 provided with the conventional gas taps $t$ and is discharged into line 40 containing recycle gas in which it forms a suspension and is carried in this form to an upper portion of reactor 5. This completely regenerated catalyst is passed into a stripping section 42 disposed in the upper portion of the reactor 5 where it is treated with a hydrogen-containing gas, e. g., recycle gas, or the like, introduced via line 41 for the purpose of dislodging residual oxygen, $CO_2$, steam and the like, which may be occluded or otherwise associated with the said regenerated catalyst. The hydrogen-containing gas also serves to "pretreat" the catalyst. The pretreat catalyst is withdrawn from 42 via a dip leg 1 as shown.

In order to give further explanation of the present invention, the following operating conditions are set forth:

*Conditions in reactor 5, product quality and yield*

[Catalyst Composition $Mo_2O_3$ on alumina.]

| | Preferred | Range |
|---|---|---|
| Average Catalyst Temperature in Bed C, °F | 900 | 850 to 950 |
| Pressure in Reactor 5, p. s. i. g. | 200 | 10 to 500 |
| Temperature of Oil in Line 4, °F | 1,000 | 950 to 1,025 |
| Temperature of Recycle Gas in Line 10, °F | 1,000 | 900 to 1,200 |
| Pounds of Catalyst Per Pound of Oil: | | |
| from C-1 | 0.5 | 0.3 to 1.0 |
| from C-2 | 4 | 3 to 10 |
| Cu. Ft. of Recycle Gas Per Bbl. of Oil Fed to Reactor 5 | 4,000 | 2,000 to 5,000 |
| Concentration of Hydrogen in Recycle Gas line 10, percent | 65 | 60 to 80 |
| Feed Inspection: | | |
| Boiling Range | 230–330° F. (Vapor Temperature) | |
| Weight Percent Aromatics | 10 | |
| Weight Percent Naphthenes | 39 | |
| Octane No. CFRR | 50 | |
| Production Inspection: | | |
| Boiling Range | $C_4$–430° F. (Vapor Temperature) | |
| Volume Percent Aromatics | 54.6% of $C_5$–430° F. (Vapor Temperature) | |
| Dry Gas, Wt. Percent | 13.7 | |
| Weight Percent Carbon Formed on Feed | 1.0 | |
| Octane No. CFRR | 98 | |
| Yield 10 lb. Reid Vapor Pressure Gasoline | 83 | |

*Conditions in regenerator 31*

| | Preferred | Range |
|---|---|---|
| Temperature of Catalyst in Bed $C_1$ ° F | 1,125 | 1,050 to 1,200 |
| Temperature of Catalyst in Bed $C_2$ ° F | 1,000 | 950 to 1,050 |
| Percent of Total Catalyst in Regenerator 31 Fed Through Line 32 | 89 | 80 to 95 |
| Percent of Total Catalyst in Regenerator 31 Fed Through Line 33 | 11 | 5 to 20 |
| Ft.³ Air/Lb. Catalyst Fed to the Regenerator 31 | 0.4 | 0.3 to 0.5 |
| Concentration of Oxygen in Gasiform Material Entering Bed $C_2$ percent | 16 | 10 to 19 |
| Concentration of Oxygen in Fumes Leaving Regenerator 31 Through Line 46 percent | 0 | |
| Wt. percent Carbon on Catalyst Returned to Reactor 5 from Bed $C_2$ | 0.35–0.60 | |
| Wt. percent carbon on Catalyst Returned to Reactor 5 from $C_1$ | 0 | |

To recapitulate briefly, the present invention relates to improvements in hydroforming naphthas and has particular reference to a method in which the catalyst is regenerated so as to secure the benefits of high catalyst to oil ratio in the reactor without causing the formation of inordinately large amounts of carbon during the hydroforming reaction. It is to be noted that contrary to current proposals, auxiliary cooling means are not required in the regenerator. Furthermore, the major portion of the heat necessary to support the endothermic reaction is supplied by the hot catalyst circulated in the manner indicated, thus requiring the introduction of less sensible heat through the medium of hydrogen-containing gas and feed.

Other and further advantages of the present invention will appear to those who are familiar with the present art.

What is claimed is:

1. In the regeneration of hydroforming catalyst in the regeneration zone wherein the catalyst is in a form of a dense fluidized bed, said zone forming a part of a system including hydroforming zone and the said regeneration zone, and wherein catalyst circulates from the reaction zone to the regeneration zone, the improvement in the process which comprises recovering substantially all the sensible heat acquired by the catalyst during the regeneration for transfer of said heat to the reaction zone by substantially completely regenerating a minor portion of said catalyst by passing an oxygen-containing gas through a dense, fluidized bed of catalyst in the regeneration zone, withdrawing regeneration gases containing unconsumed oxygen overhead from said dense bed of catalyst and incompletely regenerating a major portion of said catalyst by contacting the same with said regeneration gases in the upper portion of said regeneration zone, both portions being regenerated in the absence of cooling means and returning both portions of said catalyst substantially uncooled to said reaction zone.

2. The method set forth in claim 1 in which both portions of the catalyst are regenerated in the same generally confined zone.

3. The method set forth in claim 1 in which the said portions of regenerated catalyst are separately returned to the reaction zone.

4. The method set forth in claim 1 in which the completely regenerated portion of the catalyst is treated with stripping gas to remove oxygen-containing compounds prior to return to the reaction zone.

5. In the method of hydroforming naphtha in a system comprising a reaction zone and a catalyst regeneration zone wherein the catalyst in the reaction zone is maintained in the form of a dense fluidized bed and a reaction is carried out at elevated temperatures and pressures in the presence of added hydrogen, further characterized in that carbonaceous deposits are formed on the catalyst during said reaction, the improvement which comprises withdrawing spent catalyst particles carrying carbonaceous deposits from the reaction zone, conducting the withdrawn catalyst to the regeneration zone, treating a minor portion of the spent catalyst in a dense fluidized bed in the lower portion of the regeneration zone with an oxygen-containing gas under conditions sufficient to completely regenerate said catalyst, withdrawing regeneration gases containing some unconsumed oxygen overhead from said bed, treating the major portion of said spent catalyst in the upper portion of the regeneration zone with the oxygen-containing regeneration gases withdrawn from the complete regeneration of the minor portion of the spent catalyst under conditions effecting partial regeneration of said catalyst and thereafter retaining the said completely regenerated catalyst and the partially regenerated catalyst substantially uncooled to the reaction zone in order to support the endothermic reaction of hydroforming therein taking place.

6. The method as set forth in claim 5 in which from 0.2 to 10 parts by weight of hot catalyst is fed to the reaction per part by weight of naphtha.

7. The method set forth in claim 5 in which 2,000 to 6,000 cu. ft. of hydrogen per barrel of naphtha are fed to the reaction zone.

8. The method set forth in claim 5 in which the catalyst is a group VI metal oxide carried on a support.

References Cited in the file of this patent

UNITED STATES PATENTS

| | | |
|---|---|---|
| 2,345,487 | Liedholm | Mar. 28, 1944 |
| 2,425,849 | Voorhees | Aug. 19, 1947 |
| 2,472,844 | Munday et al. | June 14, 1949 |